(12) United States Patent
Blazer et al.

(10) Patent No.: US 7,391,943 B2
(45) Date of Patent: Jun. 24, 2008

(54) FIBER OPTIC CABLES THAT ARE SEPARABLE FOR OPTICAL FIBER ACCESS

(75) Inventors: Bradley J. Blazer, Granite Falls, NC (US); George Neill Abernathy, Hildebran, NC (US); Gregory A. Lochkovic, Conover, NC (US); Reginald Roberts, Taylorsville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 56 days.

(21) Appl. No.: 11/141,413

(22) Filed: May 31, 2005

(65) Prior Publication Data

US 2006/0269198 A1 Nov. 30, 2006

(51) Int. Cl.
*G02B 6/44* (2006.01)

(52) U.S. Cl. .................. 385/100; 385/102; 385/103; 385/105

(58) Field of Classification Search .......... 385/100, 385/102, 103, 105
See application file for complete search history.

(56) References Cited

U.S. PATENT DOCUMENTS

| | | | | |
|---|---|---|---|---|
| 4,729,628 | A | 3/1988 | Kraft et al. | 350/96.23 |
| 4,763,983 | A * | 8/1988 | Keith | 385/102 |
| 5,651,081 | A * | 7/1997 | Blew et al. | 385/101 |
| 5,970,196 | A * | 10/1999 | Greveling et al. | 385/114 |
| 6,137,936 | A * | 10/2000 | Fitz et al. | 385/113 |
| 7,225,534 | B2 * | 6/2007 | Kachmar | 29/825 |
| 2003/0072545 | A1 * | 4/2003 | Kusakari et al. | 385/101 |
| 2004/0086242 | A1 * | 5/2004 | McAlpine et al. | 385/102 |
| 2005/0002622 | A1 * | 1/2005 | Sutehall et al. | 385/101 |
| 2006/0029340 | A1 * | 2/2006 | Andrews et al. | 385/100 |

FOREIGN PATENT DOCUMENTS

| | | |
|---|---|---|
| JP | 2002-090592 | 3/2002 |
| JP | 2002-090595 | 3/2002 |
| JP | 2002-090596 | 3/2002 |
| JP | 2002-090597 | 3/2002 |
| JP | 2003-227977 | 8/2003 |
| JP | 2003-227984 | 8/2003 |

* cited by examiner

*Primary Examiner*—Tina M. Wong
*Assistant Examiner*—Daniel J Petkovsek
(74) *Attorney, Agent, or Firm*—Michael E. Carroll, Jr.

(57) ABSTRACT

A fiber optic cable includes a messenger section having at least one strength member, a carrier section having at least one optical fiber therein, and a common jacket that forms a common jacket. In one embodiment, the carrier jacket has a preferential tear portion adjacent to the at least one optical fiber with a substantially continuous outer surface in the carrier jacket adjacent to the preferential tear portion. The preferential tear portion may be defined by at least one of: at least one internal void, at least one weld line, and at least one wing extending from a tape disposed about the one or more optical fibers. Various alternatives are possible. For example, the carrier jacket may also or alternatively include at least one gripping area extending for enhancing the gripping of the carrier section when pulling apart the carrier section and messenger section.

12 Claims, 9 Drawing Sheets

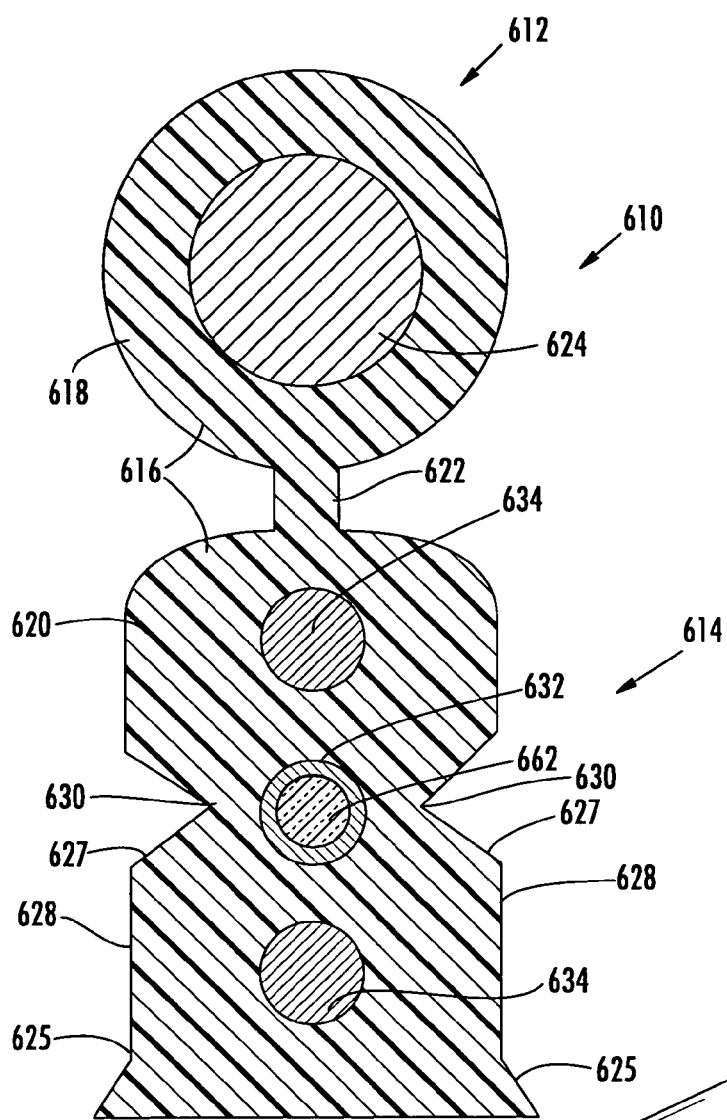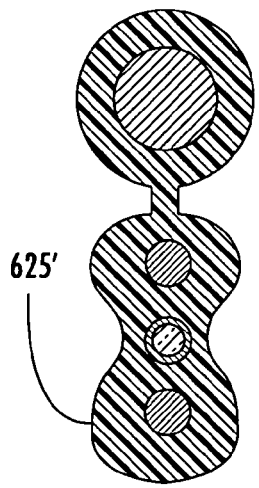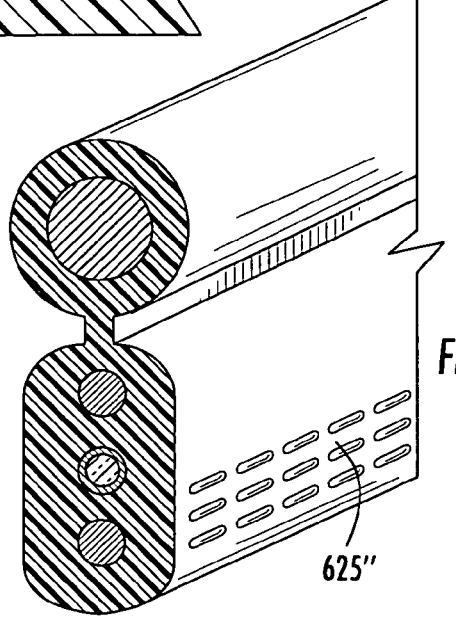
FIG. 8
FIG. 8a
FIG. 8b

FIBER OPTIC CABLES THAT ARE SEPARABLE FOR OPTICAL FIBER ACCESS

FIELD OF THE INVENTION

The present invention relates generally to fiber optic cables. Specifically, the invention relates to fiber optic cables that are easily separable by the craft for accessing the optical fiber therein.

BACKGROUND OF THE INVENTION

Fiber optic cables are designed with features that provide various functions during installation and use. For example, the cables may include one or more optical fibers for transmitting signals, protection layers and jackets disposed about the optical fibers for inhibiting damage during installation or use, strength members for strengthening the cable during installation or use, and separation members or corresponding structures within the jackets to assist in separating portions of the cable or accessing the optical fibers when desired.

As noted in JP Pub. No. 2002-090596, certain commonly available drop cable designs incorporate preferential tear notches or the like. The notches are located adjacent the optical fibers so that the craft may access the optical fibers when needed. Unfortunately, such notches may allow the unintended consequence of insect penetration into the cable and ultimately the optical fibers, thereby damaging the cable. For instance, insects such as cicadas may infest the fiber optic cable by laying eggs within the notches. Identifying and repairing such damage for a lengthy aerial drop cable can be a disruptive and expensive task. Thus, the notches of such cable designs, while suitable for providing ready and reliable access to the optical fibers during installation or service, can be problematic in not deterring undesirable insect access after installation. Therefore, it would be desirable to provide a fiber optic cable design including a preferential tear feature not only providing adequate craft access to the optical fiber or fibers within the cable, but also reducing the opportunity for insect damage to the fiber optic cable. It would also be desirable to provide drop cable designs with improved optical fiber access features, in particular for separation of a carrier portion of such a cable, and/or for reducing the weight of the cable per unit length.

SUMMARY OF THE INVENTION

It is an objective of the present invention to provide one or more fiber optic cable designs and related methods of manufacture, whereby the fiber optic cables may include one or more of preferential tear features that allow the craft to access the optical fiber or fibers within the cable while reducing the likelihood of the laying of insect infestation. Cable designs of the present invention may have other benefits such as lower weight per length of cable, and/or other benefits as described below, or as can be learned from the following disclosure or practice of the described embodiments.

According to certain embodiments of the invention, a fiber optic cable is disclosed including a messenger section, the messenger section having at least one strength member, a carrier section, the carrier section having at least one optical fiber therein, and a common jacket. The common jacket forms a messenger jacket and a carrier jacket connected by a web. The carrier jacket has a preferential tear portion therein adjacent to the at least one optical fiber. Specifically, the carrier jacket has a substantially continuous outer surface in the circumferential direction in the preferential tear portion. The preferential tear portion is defined by at least one of: at least one internal void, at least one weld line, at least one wing extending from a tape disposed about the one or more optical fibers, and at least one slit.

Various options and modifications are possible with each of the varieties of preferential tear portions described above. Also, if desired, the carrier jacket may also include at least one gripping area extending outwardly from a center of the carrier section in a direction away from the messenger section, thereby enhancing gripping when pulling apart the carrier section and messenger section.

According to other aspects of the invention, a separable fiber optic cable is disclosed, including a messenger section, the messenger section having at least one strength member, a carrier section, the carrier section having at least one optical fiber therein, and a common jacket. The common jacket forms a messenger jacket and a carrier jacket connected by a web. The carrier jacket defining an outer surface including at least one gripping area extending outwardly from a center of the carrier section in a direction away from the messenger section, thereby enhancing gripping when pulling apart the carrier section and messenger section. Various options and modifications are also possible for the fiber optic cables of the present invention. For example, the gripping area may include one of an extending lip or a slanted portion of the carrier jacket outer surface, if desired. Also, the concepts of the present invention may be applicable to fiber optic cables without a messenger section such as a flat drop cable.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operations of the invention.

BRIEF DESCRIPTION OF THE DRAWING FIGURES

FIG. 8 is a cross-sectional view of a seventh embodiment of a fiber optic cable according to certain aspects of the present invention. FIGS. 8a-8b depict alternative gripping features.

DETAILED DESCRIPTION OF THE INVENTION

Figure 1:
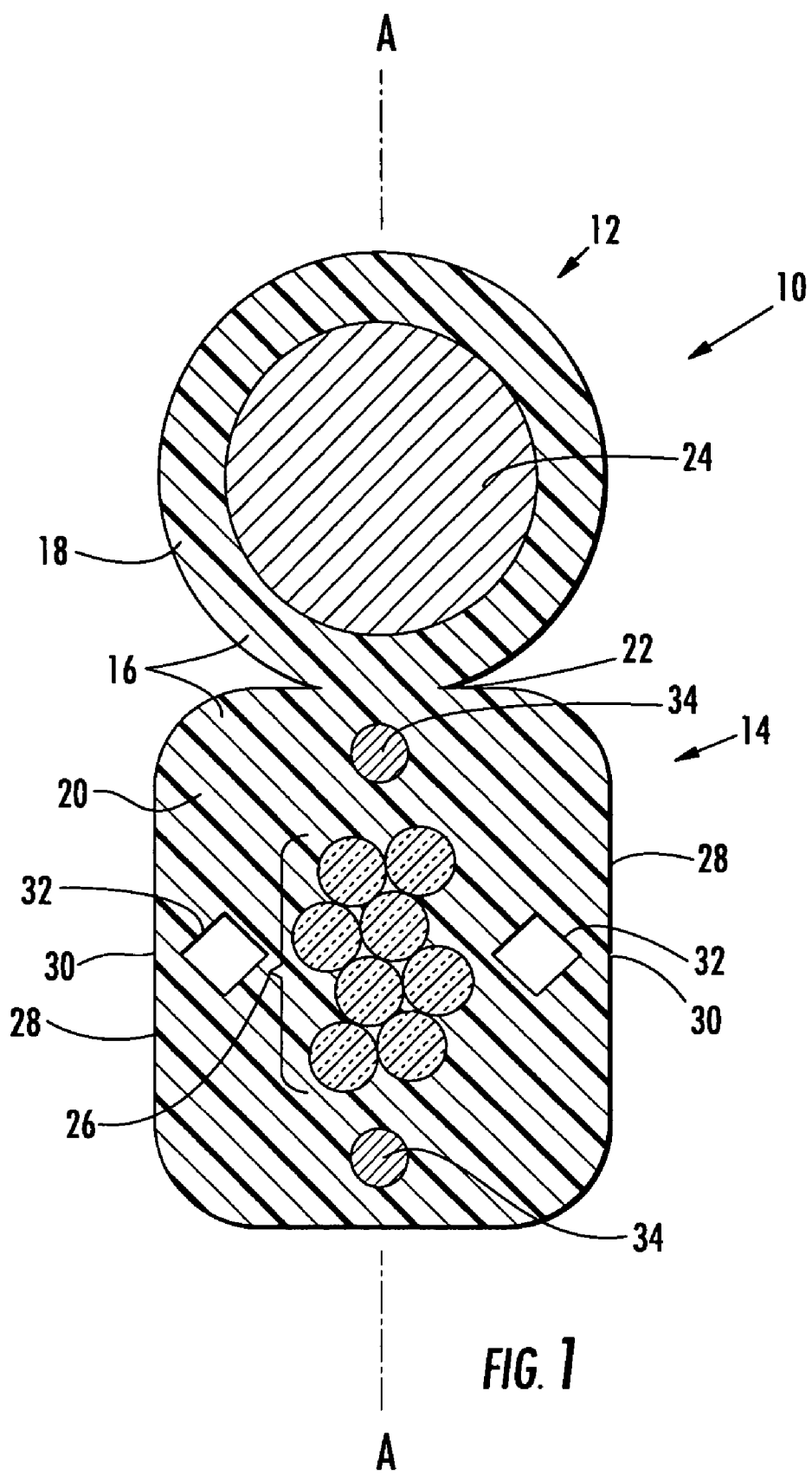
FIG. 1 is a cross-sectional view of a first embodiment of a fiber optic cable according to certain aspects of the present invention.

Detailed reference will now be made to the drawings in which examples embodying the present invention are shown. The detailed description uses numerical and letter designations to refer to features in the drawings. Like or similar designations in the drawings and description have been used to refer to like or similar parts of the invention. The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents. Examples of fiber optic cables according to various aspects of the present invention are disclosed in the figures, as described below. The various disclosed aspects of the embodiments below may be combined or modified to create further embodiments of the invention.

FIG. 1 generally depicts a fiber optic cable design according to certain aspects of the invention. As shown, cable 10 includes a messenger section 12, a carrier section 14, and a common jacket 16 forming a portion of both messenger section 12 and carrier section 14. Accordingly, it can be said that common jacket 16 includes a messenger jacket 18 and a carrier jacket 20 connected by a web 22.

Messenger section 12 includes at least one strength member therein, such as the illustrated solid metallic wire 24. Although, a solid metallic strength member is depicted other suitable strength members are possible such as a stranded wire strength member or dielectric strength members. Also, carrier section 14 includes at least one optical fiber therein, such as the eight optical fibers 26 illustrated in FIG. 1. It should be understood that the number and arrangement of the strength member(s) and/or optical fiber(s), as well as the shape of web 22, may be varied in any suitable way to arrive at a desired cable for a particular application, all of which are within the scope of the present invention. For instance, the optical fiber may be bare, colored, upcoated, buffered, a portion of a ribbon or bundle, enclosed in a sheath, or have other suitable configurations. Many but not all of those variations are illustrated in following embodiments.

As illustrated in FIG. 1, carrier jacket 20 includes an outer surface 28. At least one preferential tear portion 30 is defined within carrier jacket 20 adjacent the at least one optical fiber 26. In the example shown in FIG. 1, preferential tear portion 30 includes at least one void 32 located within carrier jacket 20 spaced inward from outer surface 28. Thus, each void 32 may be said to be internal to carrier jacket 20. Accordingly, carrier jacket 20 has a substantially continuous outer surface in the circumferential direction adjacent to preferential tear portion 30, i.e., traveling clockwise or counterclockwise about carrier jacket 20, as illustrated. As shown, by utilizing one or more internal voids such as voids 32 as opposed to notches, grooves, or the like that extend inward from surface 28, a greater distance is maintained between outer surface 28 of carrier jacket 20 and optical fibers 26. This greater distance may provide increased protection for optical fibers 26, including protection from access by insects. However, the use of internal voids 32 also provides for a preferential tear function. Thus, in achieving the preferential tear function, risk of insect damage is not substantially increased because of the substantially continuous outer surface adjacent to the preferential tear portion. Other locations for voids 32 are also possible, for instance, one or more voids could be generally located on a common axis A-A.

Additionally, voids 32 are subject to variation. For example, voids 32 need not be substantially rectangular as shown, but may have different shapes. Having stress-rising features within the voids such as corners can assist in directing the location of tearing during preferential tear operations; however, smooth or curved shapes could also be used. Further, voids 32 may extend for some or all of the length of the cable, as desired. The locations of voids 32 may be marked on the outside of the cable via ink markings, surface indicia, or any other suitable method. Also, it should be kept in mind that cable 10 need not include two symmetrically spaced preferential tear areas 30, as shown. One or more of such areas need only be utilized within the scope of the invention.

As shown, one or more strength members 34 may be provided within carrier section 14. Strength members 34 are disposed along the common axis A-A, with the preferential tear areas 30 being spaced from the common axis A-A; however, other suitable locations for strength members and/or voids are possible. Strength members 34 and 24 and optical fibers 26 may pass through tooling when extruding common jacket 16 with voids 32. Voids 32 could be formed of air, a gas, or a liquid, or other suitable materials that forms a preferential tear portion if desired.

Figure 2:
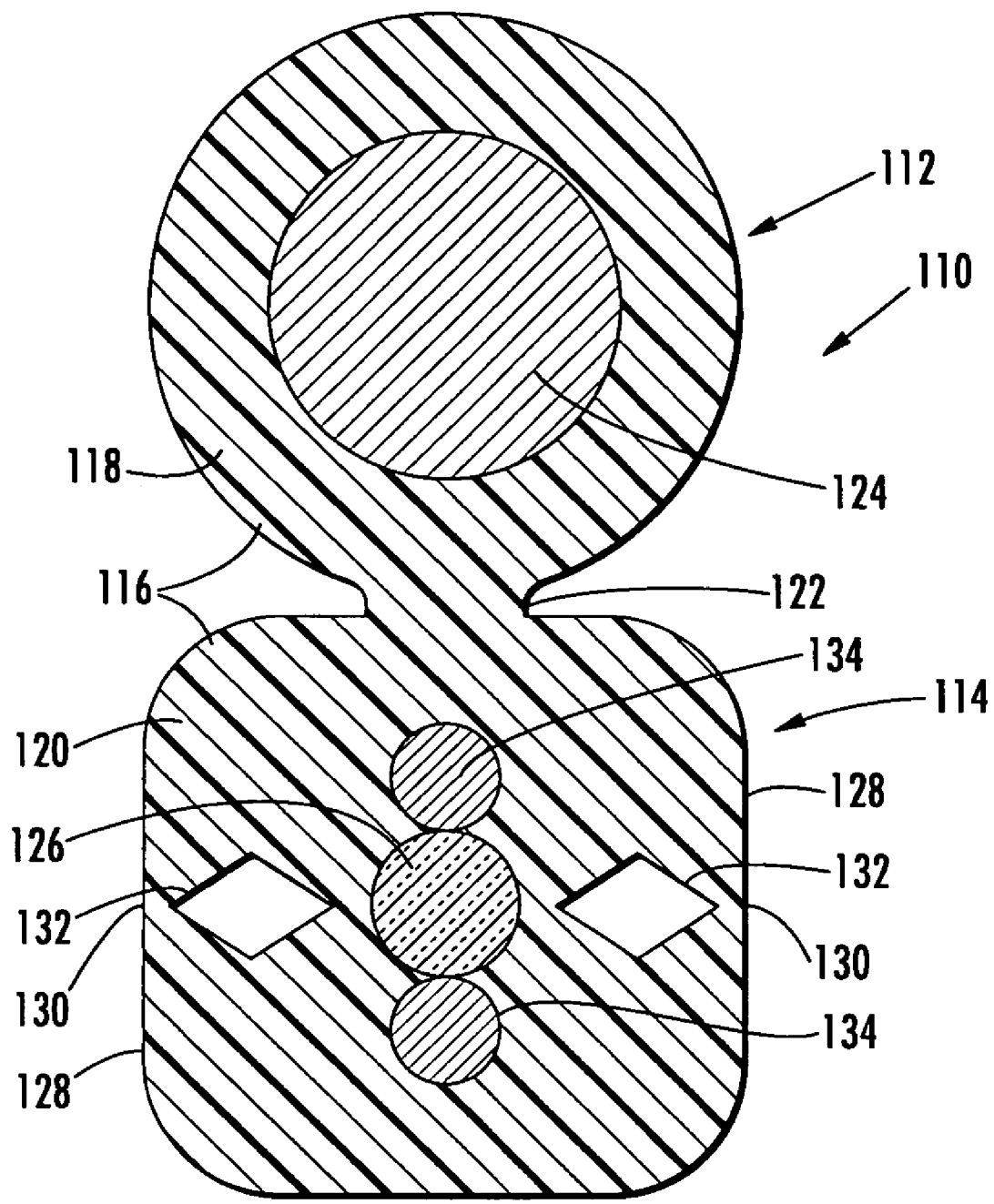
FIG. 2 is a cross-sectional view of a second embodiment of a fiber optic cable according to certain aspects of the present invention.

FIG. 2 shows a second embodiment of a fiber optic cable 110 according to other aspects of the invention. As shown, cable 110 is substantially similar to cable 10 of FIG. 1, except that cable 110 includes a single optical fiber 126, in the form of a 500 micron upcoated optical fiber. As shown, strength members 134 are larger and moved so as to contact the sides of optical fiber 126, and voids 132 are modified slightly so as to be diamond-shaped. Also, web 122 forming a preferential tear portion between messenger section 112 and carrier section 114 is slightly elongated, as compared to web 22 of cable 10. If desired, optical fiber 126 may have a water-swellable tape, yarn, or other like components disposed adjacent thereto. With FIG. 2 and later figures, like or similar components are identified in the Figures using like or similar reference numerals, throughout and not necessarily repeated herein to avoid unnecessary repetition.

Figure 3:
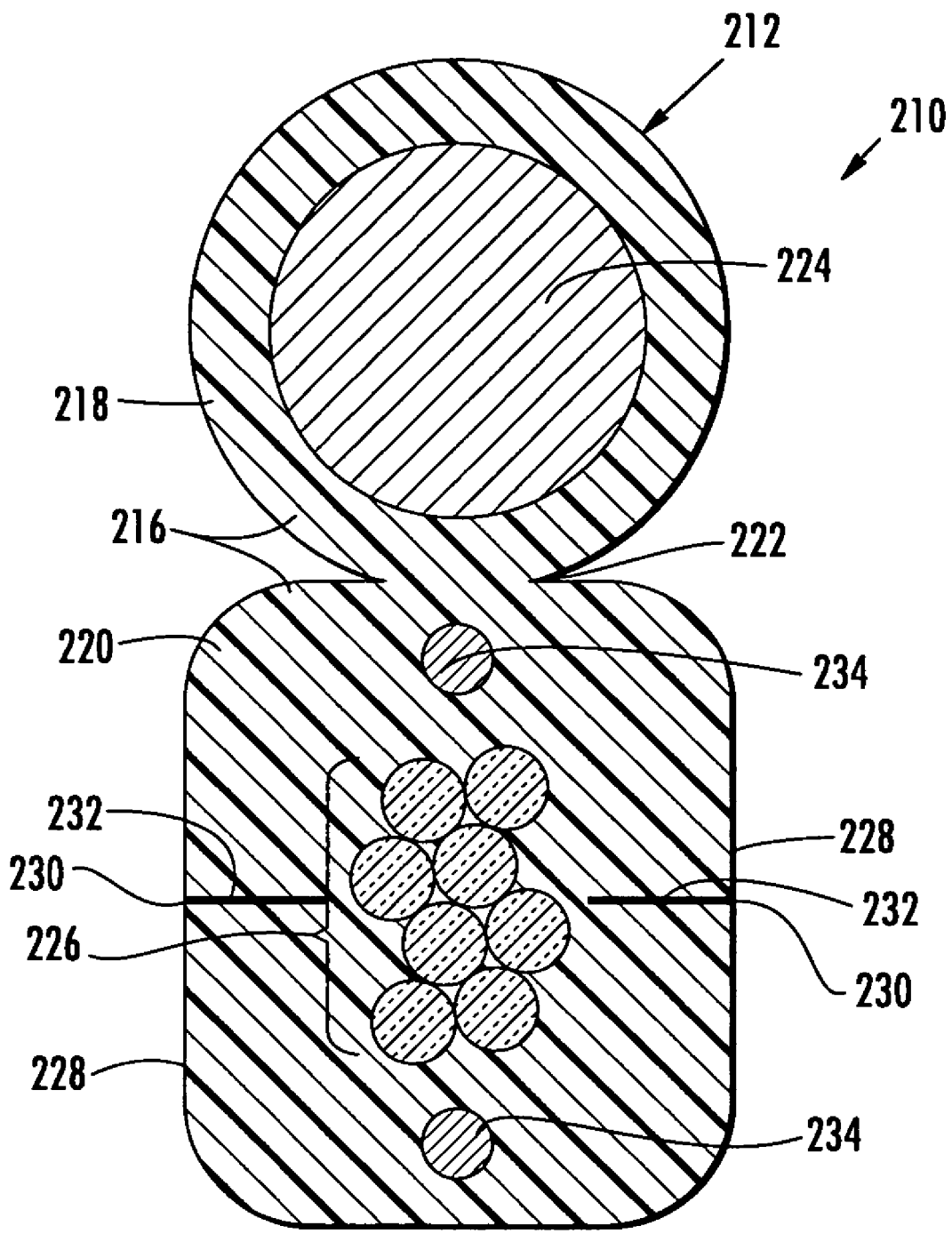
FIG. 3 is a cross-sectional view of a third embodiment of a fiber optic cable according to certain aspects of the present invention.

FIG. 3 shows another embodiment of a fiber optic cable 210 according to other aspect of the invention. As shown, cable 210 is similar to cable 10 of FIG. 1, except that cable 210 includes a different preferential tear structure. As shown, preferential tear regions 230 are formed by weld lines or slits 232 extending inward from outer surface 228. Weld lines or slits 232 are "closed," so that along surface 228 no opening is available along the outside of common jacket allowing unintended access to optical fibers 226, for example by insects. Weld lines or slits 232 are thus not open grooves, channels, or the like. Weld lines or slits 232 may be formed during extrusion by interrupting the common jacket flow during extrusion or after extrusion by slitting common jacket 16 as desired.

Figure 4:
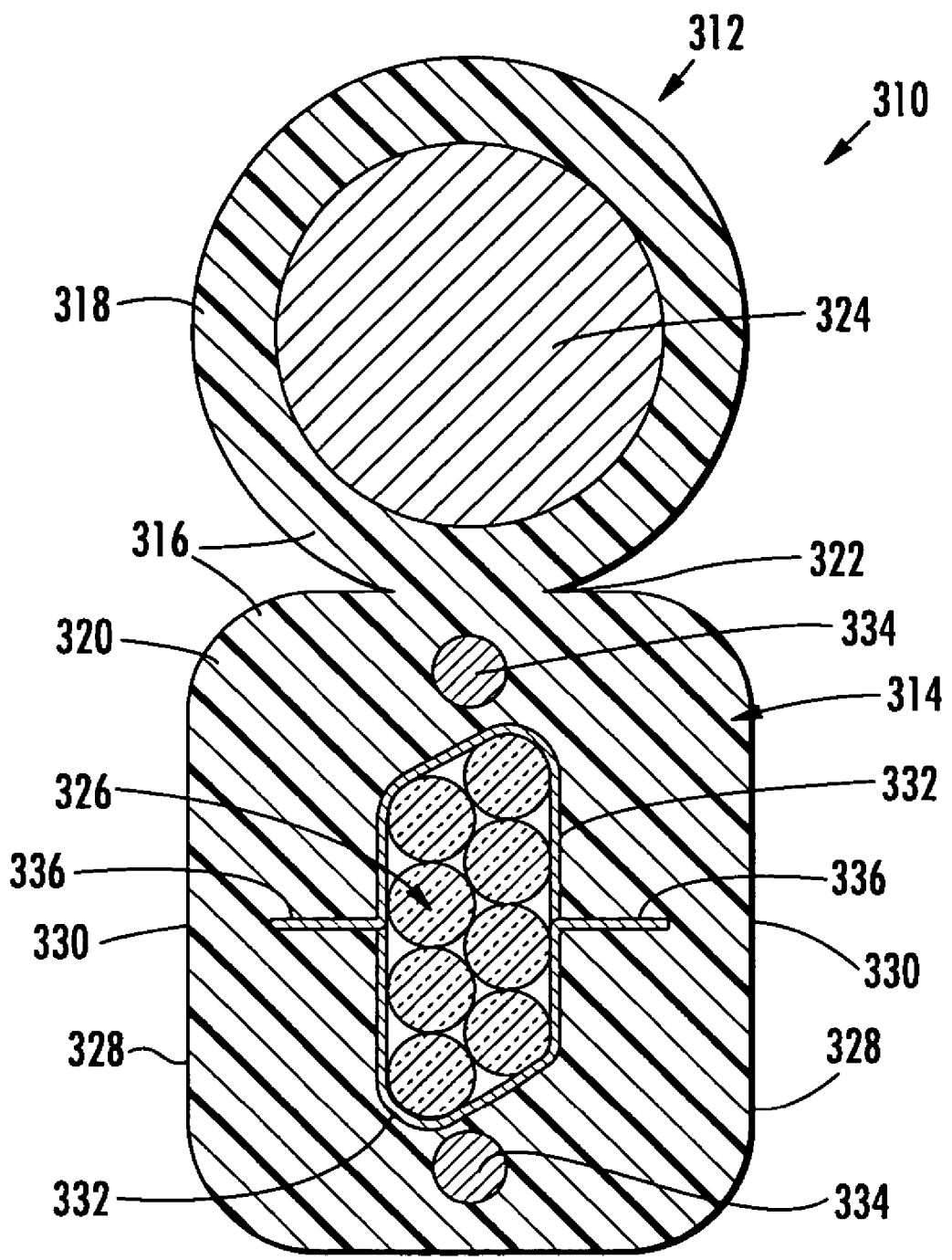
FIG. 4 is a cross-sectional view of a fourth embodiment of a fiber optic cable according to certain aspects of the present invention.
Figure 5:
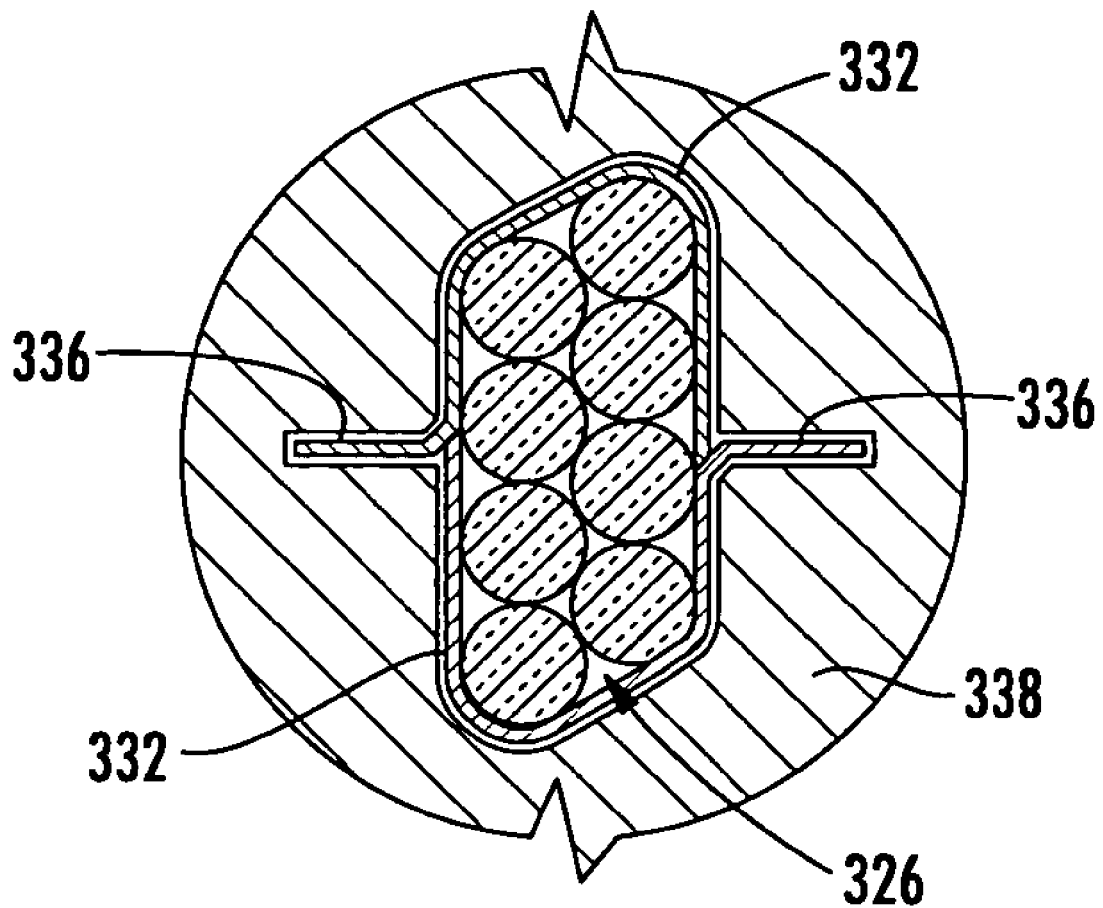
FIG. 5 is a partial cross-sectional view of an extrusion tip useful for forming the cable of FIG. 4.

FIG. 4 shows another alternate embodiment of a fiber optic cable 310. As shown therein, optical fibers 326 are wrapped in tape 332 having two wings 336 extending outward from the area of optical fibers 326 toward a surface 328. Preferential tear regions 330 are formed by tape wings 336. Tape wings 336 do not reach surface 328 of carrier jacket 320, thereby, maintaining the uninterrupted surface configuration as shown. Tape 332 may comprise one or more tapes wrapped about optical fibers 326 for achieving the orientation shown. In one, embodiment, tape 332 is a water-swellable tape for inhibiting the migration of water along the optical fibers 326. Other variations include using a sheath having wings disposed about the optical fibers. Preferably, the sheath is formed from a suitable material that does not stick to carrier jacket 320 or the sheath has a suitable release layer such as talc to inhibit sticking. FIG. 5 illustrates a tape die configuration 338 that may be used for forming tape 332 during extrusion of common jacket 316.

Figure 6:
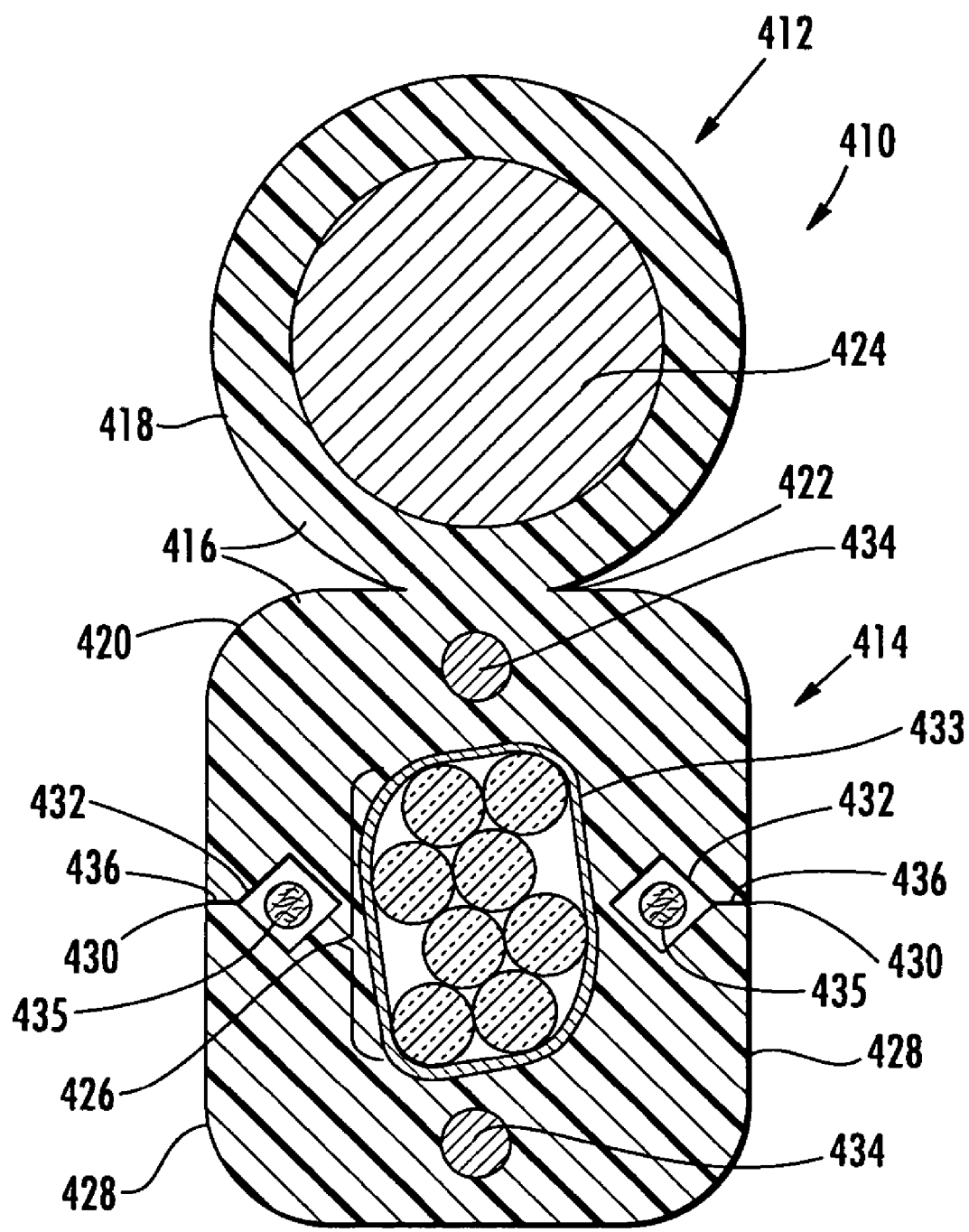
FIG. 6 is a cross-sectional view of a fifth embodiment of a fiber optic cable according to certain aspects of the present invention, combining features from the cables of FIGS. 1 and 3.

FIG. 6 shows another embodiment of a fiber optic cable 410. As shown, cable 410 includes voids 432 connected with a weld line 436, thereby forming preferential tear portions 430. Surfaces 428 adjacent preferential tear portions 430 remain substantially continuous, so as to not run the risk of unintended optical fiber access or infestation. It should be understood that voids 432 need not be used with weld lines 436, but are just shown to illustrate that various features may be mixed and/or modified in creating preferential tear portions according to the present invention. Additionally, cable 410 illustrates optical fibers 426 disposed within a sheath 433 and a water-swellable yarn disposed within each void 432 for inhibiting the migration of water.

Figure 7:
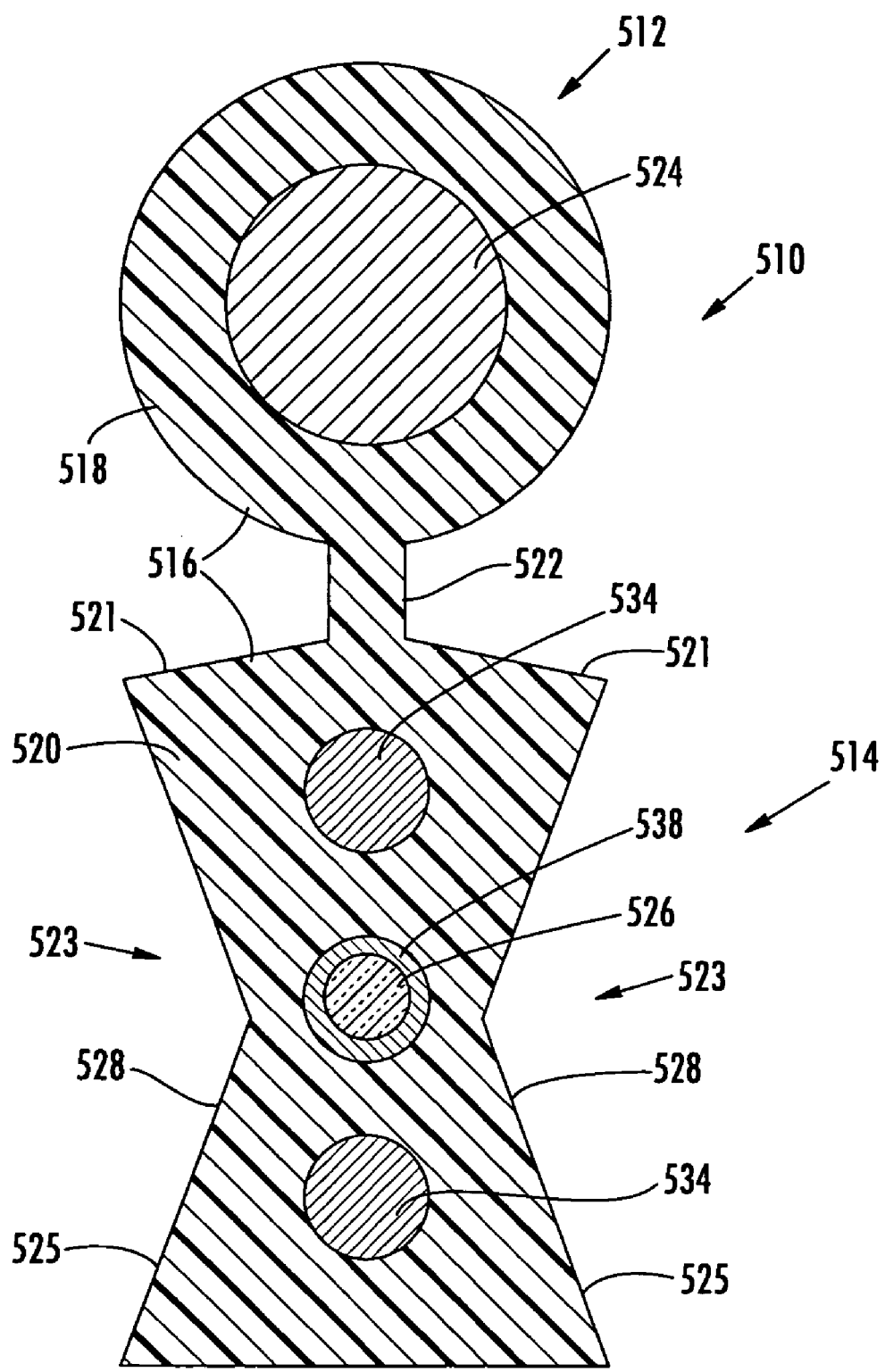
FIG. 7 is a cross-sectional view of a sixth embodiment of a fiber optic cable according to certain aspects of the present invention.

FIG. 7 shows another embodiment of a fiber optic cable 510. As shown therein, cable 510 includes a carrier section 514 with a differently-shaped outer surface 528. Cable 510 includes a cross-section that produces a cable that is relatively lightweight compared with similar conventional cables. Cable 510 achieves weight reduction by virtue of reducing the amount of material within carrier jacket 520 per unit length. Compared with the corresponding portions of cable 10, shoulder portions 521 of carrier jacket 520 are moved downward and slanted outward and down and side portions 523 are slanted in, in a wide v-shape, thereby achieving weight reductions by having less jacket material per unit length. The bottom portions 525 of the v-shaped sides 523 slant outward and down. The outward and down (away from the messenger portion) slants of portions 521 and 525 provide gripping portions that assist the craft in holding and pulling apart carrier section 514 from messenger section 512, when desired. Thus, web 522 forms a preferential tear portion in this location as known in the art. Since sides 523 veer in toward optical fiber 526, it may be surrounded by a protecting structure 538, such as a water-swellable tape, upcoating layer of the optical fiber, buffer layer, sheath, or other suitable structure disposed about one or more of the optical fibers. Additionally, an optional release layer such as talc may be applied to the protecting structure for inhibiting sticking to the carrier jacket. Of course, other gripping features and/or geometry are possible.

FIG. 8 shows another alternate embodiment of a cable 610 having an alternate gripping portion design. As shown therein, cable 610 includes a carrier section 614 having two lips 625 extending outwardly. As shown, two of such lips 625 are provided, at an end of carrier section 614. In this embodiment, the outer surface 628 of carrier section 614 includes notches 627 provided adjacent to optical fiber 626, thereby interrupting the continuity of surface 628 at preferential tear portions 630, unlike the above embodiments. It should be understood that structures such as one or more of lips 625 of FIG. 8 or other gripping features may be used with any of the embodiments herein, with or without notches or preferential tear portions. FIG. 8a depicts a gripping feature 625' in the shape of a tear drop or dogbone shape on the carrier end of a cable. Likewise, FIG. 8b depicts another gripping feature 625" that uses a textured or knurled outer surface for enhancing gripping of the carrier section. Alternatively, or in addition the messenger section of the cable can have a gripping feature for enhancing separation performance.

Figure 9:
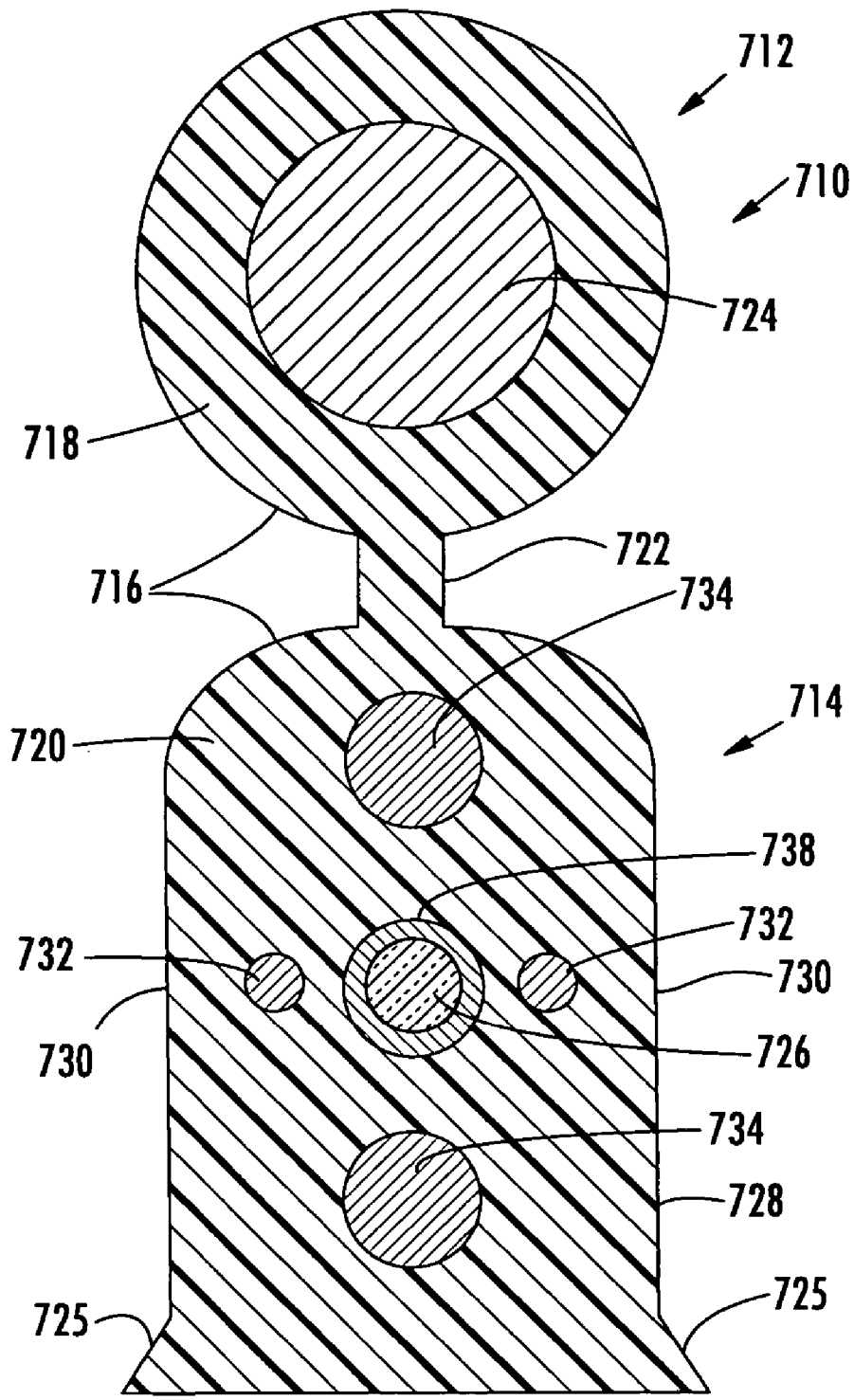
FIG. 9 is a cross-sectional view of an eighth embodiment of a fiber optic cable according to certain aspects of the present invention.

FIG. 9 shows another alternate embodiment in which a cable 710 is provided having a smooth outer surface 728 and including a gripping area comprising two lips 725. Two rip cords 732 are provided to create a preferential tear area 730 in this embodiment. Cable 710 differs from cable 510 in that carrier jacket 720 is thicker in cable 710, thereby providing additional protection that may be useful in some applications.

Many modifications and other embodiments of the present invention, within the scope of the appended claims, will become apparent to a skilled artisan. For example, the optical fibers could be packaged within buffer tubes as well as bundles, loose bare or colored optical fibers, or other suitable arrangements as known. Additionally, optical fibers could be stranded within the cable. Fiber optic cables may also include other suitable cable components and/or configurations such as armor, thixotropic filling compounds, rip cords, messenger cables, and/or other web configurations. Also variations of the structures, or modifications to same, could be combined in different ways to construct embodiments not illustrated above but still within the scope of the invention. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation.

What is claimed is:

1. A fiber optic cable comprising:
    a messenger section, the messenger section having at least one strength member;
    a carrier section, the carrier section having at least one optical fiber therein; and
    a common jacket, the common jacket forming a messenger jacket and a carrier jacket connected by a web that is frangible for separating the messenger jacket from the carrier jacket, the carrier jacket having at least one internal void that excludes cable components therein for creating a preferential tear portion for accessing the at least one optical fiber.

2. The fiber optic cable of claim 1, further including a weld line, the weld line being directed towards the at least one internal void for creating the preferential tear portion.

3. The fiber optic cable of claim 1, the carrier section having two strength members, the two strength members being disposed along a common axis.

4. The fiber optic cable of claim 1, the carrier section having two strength members, the two strength members being disposed along a common axis, wherein the at least one internal void is disposed between the two strength members.

5. The fiber optic cable of claim 1, the at least one optical fiber being selected from the group of a tight-buffered optical fiber, a colored optical fiber, an optical ribbon, an upcoated optical fiber, a bundle of optical fibers, and a sheathed optical fiber or bundle.

6. The fiber optic cable of claim 1, further including a water-swellable component.

7. The fiber optic cable of claim 1, wherein the carrier jacket includes at least one gripping area that protrudes from the carrier jacket, thereby enhancing gripping of the carrier section when pulling apart the carrier section and messenger section.

8. A fiber optic cable comprising:
    a messenger section, the messenger section having at least one strength member;

a carrier section, the carrier section having at least one optical fiber therein; and a common jacket, the common jacket forming a messenger jacket and a carrier jacket connected by a web that is frangible for separating the messenger jacket from the carrier jacket, the carrier, jacket defining an outer surface, the outer surface including at least one gripping area that protrudes from the carrier jacket, thereby enhancing gripping of the carrier jacket when pulling apart the carrier section and messenger section.

9. The fiber optic cable of claim 8, wherein the gripping area includes one of an extending lip or a slanted portion of the carrier jacket outer surface.

10. The fiber optic cable of claim 8, wherein the carrier jacket includes a preferential tear portion adjacent the at least one optical fiber, the carrier jacket having a substantially continuous outer surface, in the circumferential direction in the preferential tear portion, the preferential tear portion being defined by at least one of: at least one internal void, at least one weld line, and at least one wing extending from a tape disposed about the one or more optical fibers.

11. A fiber optic cable comprising;
a messenger section, the messenger section having at least one strength member;
a carrier section, the carrier section having at least one optical fiber therein; and
a common jacket, the common jacket forming a messenger jacket and a carrier jacket connected by a web, the carrier jacket having a preferential tear portion therein adjacent the at least one optical fiber, the carrier jacket having a substantially continuous outer surface in the circumferential direction in the preferential tear portion, the preferential tear portion being defined by at least one of: at least one internal void that excludes cable components, at least one weld line, and at least one wing extending from a tape disposed about the one or more optical fibers.

12. The fiber optic cable of claim 11, wherein the carrier jacket includes at least one gripping area extending outwardly from a center of the carrier section in a direction away from the messenger section, thereby enhancing gripping of the carrier section when pulling apart the carrier section and messenger section.

* * * * *